Nov. 12, 1935.   R. ERBAN   2,020,677
FRICTION GEAR
Filed Jan. 24, 1934
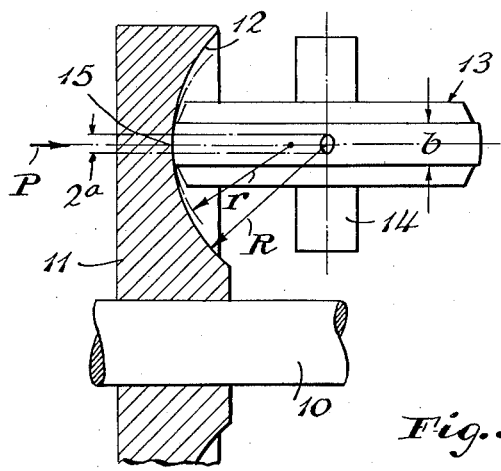
Fig.1.
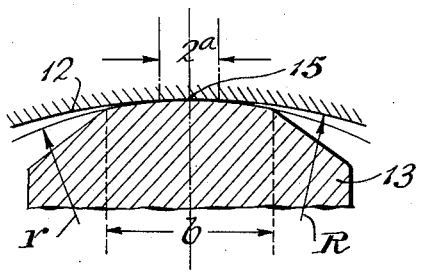
Fig.2.
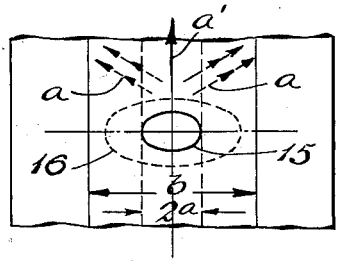
Fig.3.
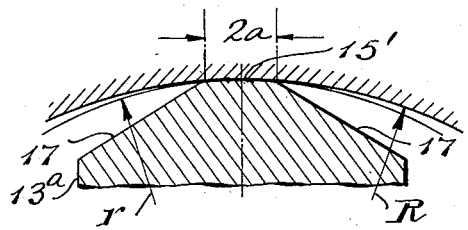
Fig.4.
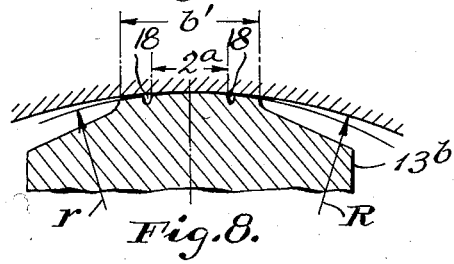
Fig.7.
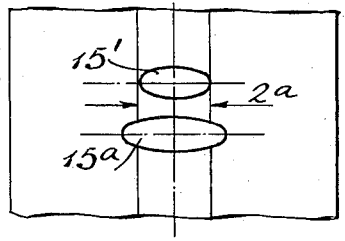
Fig.5.
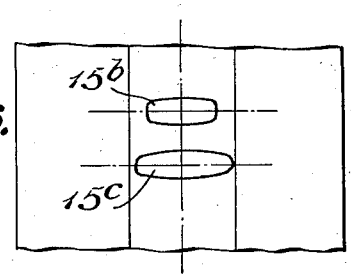
Fig.6.
Fig.8.
INVENTOR
RICHARD ERBAN
BY
ATTORNEY Patented Nov. 12, 1935

2,020,677

UNITED STATES PATENT OFFICE 2,020,677

FRICTION GEAR

Richard Erban, Vienna, Austria, assignor to Erban Patents Corporation, a corporation of New York Application January 24, 1934, Serial No. 708,023
In Austria February 9, 1933

12 Claims. (Cl. 74—200)

This invention relates to improvements in friction gears, and has generally in view to provide simple, practical means to reduce the transmission losses occurring during the operation of such gears, and to increase the attainable coefficient of traction; i. e., the ratio between the pressure force holding the rolling bodies in contact with each other and the transmissible circumferential force in the presence of which slip of the rolling bodies relative to each other does not occur.

The invention more particularly is concerned with friction gears which operate in the presence of a cooling or lubricating liquid. In such cases, where the rolling bodies as heretofore constructed rotate at relatively high rates of speed, serious difficulties have arisen owing to the fact that as the velocity increases the friction losses also increase while the coefficient of traction decreases. Frictional losses increase due to the increase with velocity of the rolling bodies of frictional and capillary resistances offered to the efflux of the liquid cooling or lubricating medium from the pressure area between the rolling bodies to and through the small cross sectional areas between the rolling bodies surrounding the pressure area, while the coefficient of traction decreases due to a considerable part of the pressure exerted on the rolling bodies to hold them in contact, and which increases with increase in the velocity of the rolling bodies, being required to force the liquid from the contact or pressure area. Accordingly, the present invention has more particularly in view to so construct one or the other or both of a cooperating pair of rolling bodies as to permit substantially free efflux of liquid from the pressure area between the bodies as the latter rotate, thereby to accomplish the purposes aforementioned.

With the foregoing and other purposes in view, which will become more fully apparent as the nature of the invention is better understood, the same consists in the novel features of construction as will be hereinafter more fully described, illustrated in the accompanying drawing, and defined in the appended claims.

In the drawing, wherein like characters of reference denote corresponding parts in related views:

Figure 1 is a diagrammatic sectional view of a conventional friction gear illustrating the conditions of frictional engagement and contact between a cooperating pair of rolling bodies of the gear.

Figure 2 is a sectional view on an enlarged scale through the pressure area between the rolling bodies.

Figure 3 is a diagrammatic view at right angles to Figure 2.

Figure 4 is a view similar to Figure 2 showing one of the rolling bodies constructed in accordance with one practical embodiment of the invention to overcome the disadvantages inherent to a gear embodying a prior art construction as illustrated in Figures 1 and 2.

Figure 5 is a view similar to Figure 3 with reference to the construction illustrated in Figure 4.

Figure 6 is a view similar to Figure 5 illustrating a slight modification of the construction illustrated in Figures 4 and 5.

Figure 7 is a view similar to Figure 4 illustrating another practical embodiment of the invention; and Figure 8 is a view similar to Figures 3, 5 and 6 with reference to the construction illustrated in Figure 7.

Referring first to Figures 1 to 3 of the drawing for an explanation of the problem solved by the constructions illustrated in Figures 4 to 8, 10 designates a driving or driven shaft carrying a friction disk 11 which is provided with an annular, transversely arcuate raceway 12, while 13 designates a cooperating friction wheel which is mounted on a shaft 14 axially intersecting the axis of the shaft 10 and which has its peripheral face arcuately curved transversely and engaged with the arcuate surface of the raceway 12 as indicated at 15. The two rolling bodies 11 and 13 are maintained in contact with each other as at 15 in known manner by a pressure designated as P, while in accordance with general practice the radius $r$ of the transverse peripheral arc of the friction wheel is somewhat less than the radius $R$ of the transverse arc of the raceway 12. Consequently, the pressure area 15 is of elliptical shape and is of a size which is a function not only of the pressure $P$, but also of the lengths of the radii $R$, $r$ as is well known. The width of the peripheral portion of the wheel 13 which is arcuately curved on the radius $r$ is designated as $b$ and may be equal to or less than the aggregate width of said wheel. However, in accordance with all prior art constructions the width $b$ amounts to a multiple of the length or major axis of the elliptical pressure area 15 in the direction of the axis of the wheel 13, which length or major axis of said pressure area is denoted as $2a$ in accordance with the symbols of the Herz equation.

The present invention is predicated upon the fact that the traction coefficient is not a function only of the form and width of the pressure area 15, but, in the presence of a liquid medium between the friction surfaces, also is a function of the shape of the surfaces of the friction members in the immediate vicinity of the pressure area, in spite of the fact that these surface portions are not in contact with each other.

Figure 2 of the drawing shows on an exaggerated scale a section through the pressure area of friction disk 11 and the friction wheel 13, and Figure 3 correspondingly illustrates an elevation of the pressure area and the area immediately surrounding the same. As in Figure 1, R designates the radius of profile of the raceway 12, r designates the radius of the profile of the friction wheel 13, b designates the width of the peripheral portion of the wheel 13 which is arcuately curved on the radius r, and 2a designates the major axis or length of the pressure area ellipse in the direction of the axis of the friction wheel 13.

During rotation of the friction wheel 13 the pressure ellipse describes a track having the width 2a, and such liquid as happens to be in or on this path or track must be squeezed away forwardly and laterally, or, in other words, generally in the direction of the arrows a in Figure 3, assuming rotation of the friction wheel 13 in a direction as indicated by the arrow a'.

As aforesaid, the width b of the friction wheel 13 is, according to the prior art, a multiple of the major axis 2a of the pressure area, or is at least of materially greater width than the major axis of said pressure area. On the other hand, the radii R, r are of such lengths that outwardly of the pressure area 15 in the immediate vicinity thereof the depth of the space between the profiles of the rolling bodies is very small. For example, the great majority of ratios R, r according to general practice are such that between the profile surfaces of the rolling bodies a clearance of only a few hundredths of one millimeter is attained at a distance from the center of the pressure area which roughly corresponds to twice the distance from the center to the circumference of said area. In Figure 3 the elliptical pressure area is indicated by a solid line and the zone of small distance between the profiles of the rolling bodies immediately surrounding said pressure area is indicated by the dotted line ellipse 16, which ellipse it will be noted has a major axis approximately twice that of the pressure area ellipse 15. Consequently, the liquid squeezed away laterally from the path or track of the pressure area 15 will not come to rest directly alongside said path or track because the zone 16 is incapable of absorbing or accommodating the liquid displaced from said pressure area 15; hence, as the pressure area 15 progresses with rotation of the rolling bodies the liquid also must be squeezed from the path or track of the zone 16, which means an increase in the resistance to rotation of the rolling bodies.

Where high speeds are involved the time available for squeezing of the liquid from the path or track of the pressure area 15 into, through and from the path or track of the zone 16, is so slight that in order for the liquid to be displaced a high pressure P must be exerted; also, the frictional and capillary resistances to efflux of the liquid are quite high because of the very slight depth of the zone 16. A considerable portion of the pressure P therefore must be utilized to effect efflux of the liquid and as a consequence the pressure which is effective on the contact area 15 is considerably less than the total pressure P, which, of course, means a restriction in the transmissible circumferential force, or, in other words, a diminution in the coefficient of traction.

Now, according to the present invention the surface of at least one of the friction members 11, 13, is so shaped that laterally adjacent to the path or track of the pressure area 15 there are spaces into which the liquid squeezed from the pressure area 15 may freely escape, such spaces being adequately large in order that such liquid as is displaced may be received and accommodated under conditions free from resistance with the result that on the one hand the displacement of the liquid from the zone 16 encounters little or no resistance while, on the other hand, displacement of the liquid outside of said zone 16 does not occur.

According to the practical embodiment of the invention illustrated in Figure 4 where the friction wheel 13a is shown as drawn to the same scale as the friction wheel 13 in Figure 2, the breadth of the pressure area 15' in the direction of the axis of the wheel is indicated as 2a, and along this breadth is formed the profile of the wheel by an arc having the radius r. At each side thereof the arc changes into a chord 17 such that the distance between the surfaces of the rolling bodies from the edges of the pressure area 15' outwardly increases very rapidly. Hence, in the zones to either side of the pressure area 15' there does not occur any squeezing action upon the liquid, with the result that such frictional losses and such losses in the pressure P as are occasioned in prior art devices and as exemplified in Figures 1 to 3, are eliminated. It is only in the path or track of the pressure area 15' that a slight displacement of the liquid occurs, but even here the pressure drop is diminished because the distance the liquid must flow to escape the pressure area is reduced roughly by more than one-half.

The pressure area 15' under normal conditions has approximately the elliptical form and the width 2a illustrated in Figure 5. However, due to transient overloads it might expand as indicated at 15a in Figure 5 if the wheel 13a had an unbroken arc of the width b as illustrated in Figure 3. Since in the embodiment illustrated in Figure 4, however, the portions of the wheel profile laterally outward of the strip with the width 2a are constituted by the chords 17 it is apparent that along the marginal edges of said strip with the width 2a very high loads would arise in the event of expansion of the pressure area as indicated at 15a. In fact, the load or stress of the material under some conditions might grow to such proportions as seriously to damage the friction surfaces of the rolling bodies. The same thing would be true if the wheel 13a should be laterally tilted slightly, in which event the wheel would run substantially on only one edge with abnormally and inadmissibly high loads. To avoid these difficulties the strip of profile of the wheel 13a bounded by the arc may be made slightly wider than the width 2a of the pressure area 15' under normal loads, as illustrated in Figure 6, while a profile other than circular, elliptical for example, may be employed so that the curvature of the profile centrally is somewhat less and marginally somewhat greater than the circular profile illustrated in Figures 2 and 4, with the result that the pressure area under normal loads would assume a somewhat rectangular form as indicated at 15b in Figure 6. In the event of use of a profile of other than circular form as stated, elliptical for example, then upon the production of an excessive load the width of the pressure area in the direction of the axis of the wheel 13a would not increase appreciably and still would be accommodated upon a profile of the width illustrated in Figure 6, as indicated at 15c in said figure. Also, a non-circular profile would to a certain extent insure against lateral shifting of the pressure surfaces.

Another practical embodiment of the invention is illustrated in Figures 7 and 8 of the drawing, which figures, as in the case of Figures 4 to 6, are drawn to the same scale as Figures 2 and 3. The friction wheel is designated as 13b and has the profile radius r, while the friction disk is designated as 11b and has a raceway with the profile radius R. The path or track of the pressure area 15d again is designated as 2a, and in the profile of the wheel 13b, directly adjacent to each side of the profile strip 2a thereof, is formed an annular groove 18. Assuming the radii r, R to be in or approximately in accordance with prior practice as generally set forth in connection with the illustrations of Figures 1 and 2 of the drawing, then the pressure area 15d under normal loads will develop within the side limits of the profile strip 2a as indicated in Figure 8 and the liquid squeezed from said area will escape freely into the grooves 18. Thus, as compared with prior constructions as exemplified in Figures 1 and 2, there are attained the advantages of a very considerable reduction in the pressure P to effect the liquid displacement and a consequent substantial increase in the coefficient of traction.

According to the embodiment of the invention illustrated in Figures 7 and 8 the profile of the wheel 13b having the radius r is of a width b' substantially greater than the width of the profile strip 2a. Thus, upon the occurrence of transient abnormally high loads with expansion of the pressure area, the wheel profile outwardly of the grooves 18 will be called upon for carrying load as indicated at 15e in Figure 8. While it is true, of course, that in this form of construction such liquid as may happen to be on the wheel profile sections outwardly of the grooves 18 must be partially or entirely displaced in the event of abnormally high transient pressures, it will be readily appreciated that owing to the provision of the grooves 18 the distance which the liquid must flow in order to escape is so shortened that again there are attained the advantages of a very considerable reduction in the pressure P to effect the displacement and a consequent substantial increase in the coefficient of traction.

In a gear embodying a construction in accordance with the invention and as illustrated in either of Figures 4 or 7, it obviously is possible to choose larger values for the ratio R:r than have heretofore been feasible, so that the specific load of the material comprising the rolling bodies is reduced without reduction in the coefficient of traction. In that event and in the case of the construction illustrated in Figure 4, suitable transition arcs should be provided between the profile arc or strip 2a and the chords 17, whereas in the case of the construction illustrated in Figure 7 only the radius of curvature of the two profile strips outwardly of the strip 2a must be chosen somewhat less than that for the median strip so that, in the presence of normal loads, contacting or engagement of the said profile strips with the cooperating arcuate surface of the other friction member does not occur. As long as the specific loads are not unduly high, rounding off of the groove edges is hardly necessary, since the material as a result of permanent deformation will assume such shape as to preclude overloading of the edges. All that is required is that the load shall not be permitted to grow to such proportions as to stress the edges beyond the limit of their carrying capacity. After deformation of the edges they will carry less load. Therefore, further deformation will occur in other parts of the friction surfaces substantially without damage thereto.

It will be evident from the foregoing that the profile curve inside of the pressure area itself may be either arcuate or may depart somewhat from arcuate shape, and that the features of the invention may be embodied in either of the friction members to the exclusion of the other or in both of the members.

From the foregoing description considered in connection with the accompanying drawing it is believed that the features and advantages of the invention will be clearly understood. It is desired to point out, however, that while only certain specific embodiments of the invention have been illustrated and described, the same is readily capable of embodiment in other constructions within its spirit and its scope as defined in the appended claims.

I claim:

1. In a friction gear, a pair of rotatable friction bodies each having a different radius of curvature in engagement with each other, the friction surface of at least one of said bodies being of arched form and of irregular contour and so shaped that outwardly of and immediately adjacent to the path of the pressure area between the bodies relatively narrow spaces are provided into which liquid squeezed from the pressure area may freely escape.

2. In a friction gear, a pair of rotatable friction bodies each having a different radius of curvature in engagement with each other, the friction surface of at least one of said bodies being of arched form within the side limits of the path of the pressure area between the bodies, and having, even when unloaded, its face immediately adjacent to either side of said path extending back in spaced relationship to lateral prolongations of the arched surface of said path only sufficiently to permit lubricating fluid to circulate freely in the spaces so formed.

3. In a friction gear, a pair of rotatable friction bodies each having a different radius of curvature in engagement with each other, the friction surface of at least one of said bodies being of arched form and outwardly of the path of the pressure area between the unloaded bodies being of sharper curvature than within the side limits of said path.

4. In a friction gear, a pair of rotatable friction bodies in engagement with each other, the friction face of at least one of said bodies being of arched form and having a groove immediately adjacent to and at each side of the path of the pressure area between the bodies.

5. In a friction gear, a pair of rotatable friction bodies in engagement with each other, the friction face of at least one of the bodies being of arched form throughout a greater width than the width of the path of the pressure area between the bodies and having a groove immediately adjacent to each side of the path of the pressure area.

6. In a friction gear, a pair of rotatable friction bodies in engagement with each other, the friction faces of both of said bodies being of arcuate form and curved on radii of curvature differing slightly from each other, within the side limits of the path of the pressure area between the bodies and from said side limits outwardly being constituted by chords inclined at a slight angle to the adjacent surface of the other body.

7. In a friction gear, a pair of rotatable friction bodies in engagement with each other, the friction face of at least one of said bodies being of arched non-arcuate form within the side limits of the path of the pressure area between the bodies and from said side limits outwardly extending back in spaced relationship to lateral prolongations of said arched surface only sufficiently to permit lubricating fluid to circulate freely in the spaces so formed.

8. In a friction gear, a pair of rotatable friction bodies in engagement with each other, the friction face of at least one of said bodies being of arcuate form and of greater width than the width of the path of the pressure area between the bodies, said face having a groove immediately adjacent to and at each side of the path of the pressure area.

9. In a friction gear, a pair of rotatable friction bodies in engagement with each other, the friction face of at least one of said bodies being of arched non-arcuate form and of sharper curvature marginally than medially, said face having a groove therein immediately adjacent to each side of the path of the pressure area between the bodies and said path being located medially of the friction face and being of less width than said face.

10. In mechanism for the transmission of power by the adhesive driving contact of races and rollers, and in which lubricating fluid is applied adjacent the area of contact, a toric friction surface provided on the race, a roller provided with a friction surface having a transverse curvature slightly greater than the transverse curvature of the race, so that the spacing between said surfaces is within the limits of capillary action of the lubricating fluid, and restricted portions of the friction surface of said roller being cut away so as to form spaces into which the lubricating fluid may flow with relatively slight resistance.

11. In mechanism for the transmission of power by the adhesive driving contact of a toric race and a roller, and in which lubricating fluid is applied adjacent the area of contact, a roller provided with a friction surface having a transverse curvature slightly greater than the transverse curvature of the race, so that the spacing between said surfaces is within the limits of capillary action of the lubricating fluid, and restricted annular portions of the friction surface of said roller being cut away so as to form spaces between the race and the roller into which the lubricating fluid may flow with relatively slight resistance.

12. In a friction gear a pair of rotatable friction bodies adapted for adhesive rolling contact with each other, the friction face of at least one of said bodies being of arcuate transverse section and of greater curvature at its marginal portions than at its intermediate portions, the contact area between the bodies being located medially of the friction face of said body and being of less width than the width of said medial portions thereof, and the said marginal portions thereof being positioned in adjacency to said contact area and on each side thereof, and having restricted portions of the friction surface adjacent to the said marginal portions cut away so as to form spaces into which the lubricating fluid may flow with relatively slight resistance.

RICHARD ERBAN.